United States Patent [19]
Stark

[11] 3,853,709
[45] Dec. 10, 1974

[54] PROCESS FOR PREPARING NEBRAMYCIN FACTORS II AND VII

[75] Inventor: William Max Stark, Indianapolis, Ind.

[73] Assignee: Eli Lilly and Company, Indianapolis, Ind.

[22] Filed: Dec. 8, 1972

[21] Appl. No.: 313,222

Related U.S. Application Data

[63] Continuation-in-part of Ser. No. 83,834, Oct. 26, 1970, abandoned.

[52] U.S. Cl. .............................. 195/80 R, 424/118
[51] Int. Cl. ............................................. C12d 9/00
[58] Field of Search ................................... 195/80 R

[56] References Cited
UNITED STATES PATENTS
3,691,279  9/1972  Thompson et al. ............... 195/80 R Primary Examiner—Joseph M. Golian
Attorney, Agent, or Firm—William B. Scanlon; Everet F. Smith

[57] ABSTRACT

A process for producing antibiotic nebramycin II, a component antibiotic of the multifactored antibiotic complex nebramycin, and nebramycin VII by culturing Streptomyces tenebrarius NRRL 3816, mutant strain ex Streptomyces tenebrarius ATCC 17920 in an aqueous nutrient culture medium under aerobic fermentation conditions. Nebramycin II is recovered from the filtered fermentation broth by chromatography over a cationic exchange resin and is separated from the newly discovered co-produced minor factor, nebramycin VII, by further chromatography over a cationic exchange resin.

3 Claims, 1 Drawing Figure

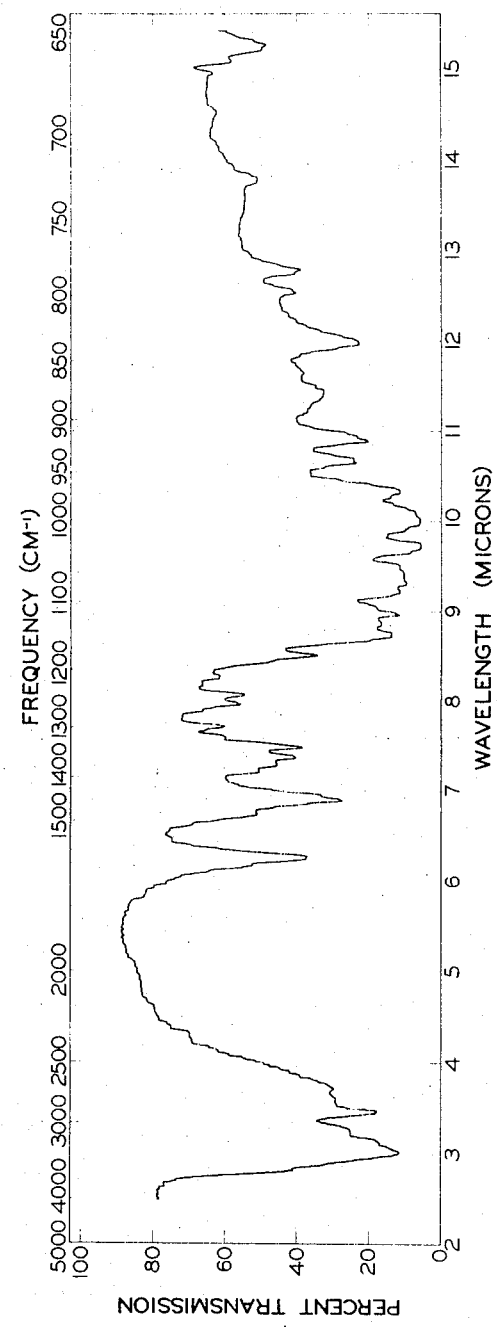

PROCESS FOR PREPARING NEBRAMYCIN FACTORS II AND VII

CROSS REFERENCE TO RELATED APPLICATION

This application is a continuation-in-part of my copending application Ser. No. 83,834 filed Oct. 26, 1970, now abandoned.

BACKGROUND OF THE INVENTION

The development of productive and economical methods for the fermentation of antibiotic-producing microorganisms presents substantial problems to the microbiologist, the chemist and the engineer. The problems associated with the large-scale production of antibiotics are often complicated when the microorganism produces multiple antibiotic factors that are closely related to each other in chemical and physical characteristics. Such a complex or mixture of antibiotic factors renders the isolation of a particular desired antibiotic factor difficult.

Attempts to produce a desired antibiotic factor to the exclusion or near exclusion of other co-produced factors have generally involved two approaches. One approach has been to control production of co-produced factors or components by shifting the ratio or choice of substrates employed in the fermentation and varying the physical environment of the antibiotic-producing microorganism by altering the temperature, pH, aeration, agitation, length of fermentation time, etc. A significant problem in trying to effect control of biosynthesis with such changes in the environment is that full control is seldom truly achieved and small fluctuations in the physical parameters may produce unpredictable results.

The second approach employed in seeking to produce a predominance of a single desired factor in a fermentation which normally produces multiple factors has been to develop a strain of the antibiotic-producing organism that will biosynthesize the desired antibiotic in greater abundance. The development of such a strain commonly involves the empirical method of strain selection. A method frequently employed for strain selection involves the treatment of a culture with a mutagen and randomly selecting isolated colonies for examination of their capability for producing the desired antibiotic. Difficulty is frequently encountered with this latter approach since the selected strain is often found to be unstable.

One example of an antibiotic fermentation in which multiple factors are produced is that which produces the new broad spectrum antibiotic nebramycin by culturing Streptomyces tenebrarius ATCC 17920 under submerged aerobic fermentation conditions, U.S. Pat. No. 3,691,279; Stark, W. M., Hoehn, M. M., Knox, N. G., Antimicrobial Agents and Chemotherapy -1967, p. 314-323; Thompson, R. Q., Presti, E. A., ibid, p. 332-340. Eight closely related antibiotic components have been separated from the nebramycin complex and have been identified by paper chromatography bioautographs. All components in the complex are basic, watersoluble compounds that are in the general class of amino-glycosidic antibiotics such as gentamicin, kanamycin, neomycin and others.

All of the major components of the nebramycin complex in the current process exhibit excellent antibiotic activity against gram-negative bacilli and staphylococci. Wick, W. E. and Welles, J. S., Antimibcrobial Agents and Chemotherapy - 1967. p. 341-348. However, nebramycin factor II is of particular importance because of its antibiotic activity against Pseudomonas species.

The isolation of each factor as a pure compound from the nebramycin complex is a time-consuming process which requires extensive column chromatography. A production process yielding only the single nebramycin component, factor II, (hereinafter nebramycin II) rather than the complex of antibiotics, would provide a more economical and desirable process for the production of nebramycin II.

it is an object of this invention to provide an improved process for the production of nebramycin II. In particular it is an object of this invention to provide an improved fermentation process for the production of nebramycin II essentially free of other antibiotic factors and thereby render the isolation of nebramycin II from the fermentation medium economically advantageous. It is a further object of this invention to provide the new nebramycin antibiotic factor, nebramycin VII.

SUMMARY OF THE INVENTION

This invention relates to an improved process for the production of nebramycin II. In particular, this invention relates to an improved fermentation process for the production of nebramycin II which comprises culturing a novel mutant strain of the nebramycin producing microorganism Streptomyces tenebrarius ATCC 17920.

This invention also relates to the novel antibiotic nebramycin VII co-produced in minor amounts with nebramycin II.

According to the practice of the present invention, nebramycin II is produced in greater abundance and to the substantial exclusion of the other known nebramycin factors by culturing a mutant strain of Streptomyces tenebrarius ATCC 17920 in a culture medium containing assimilable sources of carbon, nitrogen and inorganic salts under submerged aerobic fermentation conditions until a substantial amount of nebramycin II is produced. A minor amount of a new nebramycin antibiotic, designated as nebramycin VII, is also produced by the mutant strain of this invention. The nebramycin II producing mutant strain used in the present invention is designated as Streptomyces tenebrarius NRRL 3816, mutant strain, ex S. tenebrarius ATCC 17920 and has been deposited without restriction as to availability with the permanent culture collection of the Northern Utilization Research and Development Division, Agricultural Research Service, United States Department of Agriculture, 1815 North University Street, Peoria, Illinois 61604 where it has been assigned the accession number NRRL 3816.

Nebramycin II and the minor component, nebramycin VII can be recovered from the fermentation medium by a variety of procedures commonly employed in the antibiotic fermentation art. For example the antibiotics can be recovered by extracting the filtered broth with a suitable water-immiscible solvent or by liquid-liquid extraction in a counter-current distribution apparatus or by adsorption on a cationic exchange resin.

Nebramycin II and nebramycin VII are conveniently recovered from the filtered fermentation broth by adsorption on a suitable cationic exchange resin, for example, by adsorption on an exchange resin of the IRC-50 type. The adsorbed antibiotics are then eluted from the resin with a suitable base such as dilute ammonium hydroxide and obtained in crude form by evaporation of the eluate. Nebramycin II is further purified by separating the antibiotic from the minor co-produced factor, nebramycin VII, by gradient elution chromatography over a cationic exchange resin.

DETAILED DESCRIPTION

The antibiotic nebramycin II has been previously obtained by culturing S. tenebrarius ATCC 17920 as described in U.S. Pat. No. 3,691,279. As described therein nebramycin II is one of several co-produced nebramycin antibiotic factors.

According to the present invention, nebramycin II is produced by culturing the mutant strain of *Streptomyces tenebrarius* ATCC 17920, designated as *Streptomyces tenebrarius* NRRL. 3816, mutant strain, ex *S. tenebrarius* ATCC 17920, under submerged aerobic conditions in a suitable culture medium until substantial antibiotic acitivity is imparted to the culture medium. Nebramycin II can be recovered from the culture medium by employing various isolation and purification procedures commonly used in the antibiotic fermentation art. As previously mentioned, fermentation of *S. tenebrarius* ATCC 17920 produces a mixture of the factors comprising the nebramycin antibiotic complex. Use of the special mutant strain in the practice of this invention provides a method for producing substantially only nebramycin factor II. A minor amount of a new nebramycin factor is co-produced with nebramycin II by the mutant strain of this invention. The new antibiotic factor, designated herein as nebramycin VII is generally produced in an amount corresponding to between about 5 and about 10 percent of the amount of nebramycin II produced. The new antibiotic, nebramycin VII is recovered from the filtered fermentation broth along with nebramycin II and the two antibiotics are separated from each other as hereinafter described. Other minor components of the fermentation beer, for example nebramine, occur in such minor quantities that their recovery is unrewarding. These minor components are readily removed from the desired antibiotics during their isolation and separation.

One advantage of the present method, therefore, is that since essentially only one of the nebramycin factors, nebramycin II, is produced, the recovery and isolation of the single antibiotic factor is simplified.

Nebramycin VII is a basic water soluble antibiotic which is slightly soluble in methanol and substantially insoluble in the higher alcohols and most common organic solvents. The antibiotic is obtained as fine white crystalline needles on crystallization from methanol which begin to decompose at about 265°C.

Elemental analysis of the crystalline antibiotic gave the following percent elemental composition which is in agreement with the empirical formula $C_{21}H_{41}N_5O_{12}$.

Theory: C, 45.39; H, 7.44; N, 12.61; O, 34.55
Found: C, 45.10; H, 7.53; N, 12.37; O, 34.82.

Nebramycin VII is optically active and has a specific rotation of $[\alpha]_D^{27} = +170.4°$. ($c = 0.154$ percent in water).

An x-ray diffraction powder pattern was obtained with the crystalline antibiotic using nickel filtered copper radiation of 1.5405A for calculating the interplanar spacings. The following intensity readings were obtained:

| d | $I/I_1$ |
|---|---|
| 9.20 | 1.00 |
| 8.28 | .15 |
| 7.57 | .50 |
| 6.61 | .30 |
| 6.07 | .70 |
| 5.50 | .80 |
| 5.01 | .30 |
| 4.79 | .40 |
| 4.56 | 1.00 |
| 4.35 | 1.00 |
| 4.20 | .60 |
| 4.00 | .60 |
| 3.84 | .10 |
| 3.72 | .50 |
| 3.87 | .10 |
| 3.53 | .18 |
| 3.37 | .30 |
| 3.20 | .15 |
| 3.04 | .30 |
| 2.85 | .20 |
| 2.75 | .20 |
| 2.70 | .20 |
| 2.62 | .40 |
| 2.50 | .30 |
| 2.42 | .10 |
| 2.34 | .30 |
| 2.27 | .35 |
| 2.24 | .05 |
| 2.19 | .30 |
| 2.10 | .05 |
| 2.04 | .10 |
| 1.98 | .05 |
| 1.93 | .10 |
| 1.87 | .05 |
| 1.83 | .05 |
| 1.79 | .05 |
| 1.70 | .02 |
| 1.63 | .02 |
| 1.56 | .05 |

The infrared absorption spectrum of nebramycin VII (KBr pellet) is shown in the accompanying drawing. Distinguishable absorption peaks in the spectrum over the range of 2 to 15 microns are as follows: 3.01, 3.47, 6.27, 6.91, 7.38, 7.50, 7.73, 7.98, 8.08, 8.51, 8.75, 8.97, 9.75, 10.01, 10.35, 10.65, 10.91, 11.98, 12.55, and 12.81 microns.

Nebramycin VII shows no significant absorption in the ultraviolet portion of the spectrum.

Based on its physical and chemical characteristics nebramycin VII is more similar to nebramycin II than to the other factors of the nebramycin complex of antibiotics.

Nebramycin VII inhibits the growth of microorganisms pathogenic to animal and plant life. In particular it exhibits a high degree of activity against the gram negative organisms. The spectrum of antibacterial activity for nebramycin VII is illustrated by the data presented in Table I. In Table I the minimum inhibitory concentration (MIC) values for nebramycin VII against representative bacterial species is presented. The data were obtained by the standard agar dilution test.

Table I

Antibiotic Spectrum of Nebramycin VII

| Test Organism[1] | Minimum Inhibitory Concentration (mcg/ml) |
|---|---|
| Staphylococcus aureus 3055[2] | 8 |
| Staphylococcus aureus 3074[3] | 4 |
| Staphylococcus aureus 3130[4] | 4 |
| Streptococcus sp. (group D) 9901 | >256 |
| Streptococcus sp. (group D) 9960 | 128 |
| Enterobacter aerogenes EB2 | 8 |

Table I-Continued

Antibiotic Spectrum of Nebramycin VII

| Test Organism[1] | Minimum Inhibitory Concentration (mcg/ml) |
| --- | --- |
| Enterobacter aerogenes EB4 | 8 |
| Enterobacter cloacae EB5 | 8 |
| Enterobacter cloacae EB8 | 8 |
| Escherichia coli EC2 | 16 |
| Escherichia coli EC8 | 16 |
| Proteus mirabilis PR3 | 8 |
| Proteus mirabilis PR11 | 16 |
| Proteus morganii PR1 | 8 |
| Proteus morganii PR15 | 32 |
| Proteus rettgeri PR2 | 32 |
| Proteus rettgeri PR7 | 16 |
| Proteus vulgaris PR27 | 8 |
| Proteus vulgaris PR28 | 8 |
| Providencia sp. 439 | 32 |
| Pseudomonas aeruginosa PI1 | 64 |
| Pseudomonas aeruginosa PI12 | 16 |
| Pseudomonas aeruginosa PI21 | >256 |
| Pseudomonas aeruginosa PI23 | >256 |
| Pseudomonas aeruginosa PI24 | 256 |
| Pseudomonas aeruginosa PI27 | 64 |
| Pseudomonas aeruginosa PI37 | >256 |
| Pseudomonas aeruginosa PS9 | 16 |
| Pseudomonas aeruginosa PS10 | 8 |
| Pseudomonas aeruginosa PS14 | 8 |
| Pseudomonas aeruginosa PS15 | 8 |
| Pseudomonas aeruginosa PS34 | 4 |
| Pseudomonas cepacia 3189 | 256 |
| Pseudomonas cepacia 5629 | 128 |
| Pseudomonas maltophilia 438 | 16 |
| Pseudomonas pseudomallei 121 | 32 |
| Pseudomonas solanacearum X185 | 4 |
| Serratia marcescens SE3 | 8 |

[1] The numerals and/or letters following the named organism are strain designations of clinical isolates.
[2] Penicillin G sensitive strain
[3] Penicillin G resistant strain
[4] Methicillin resistant strain Nebramycin VII is a relatively non-toxic antibiotic substance which is useful for combatting infections in warm blooded mammals when administered parenterally at a non-toxic dose of between about 10 and 500 mg/kg of body weight. The antibiotic can be administered in any suitable pharmaceutical form, for example, in the form of a pharmaceutically acceptable salt in an isotonic solution. Nebramycin VII being a basic substance forms salts with acids. For example, salts can be formed with the mineral acids such as hydrochloric acid, sulfuric acid and phosphoric acid; the organic carboxylic acids such as the mono basic acids, acetic, benzoic, salicyclic, propionic and like acids; the dibasic acids such as, maleic, succinic, phthalic and glutaric; the tribasic acids such as citric acid; the organic sulfonic acids such as benzenesulfonic acid, p-toluenesulfonic acid, methanesulfonic acid and dodecylbenzenesulfonic acid and the like. Such salts are formed by the known methods for preparing acid addition salts of basic organic compounds. For example, a solution of the antibiotic in acetone is treated with p-toluenesulfonic acid to form the nebramycin VII p-toluenesulfonate.

The strain of the organism employed in this invention for the production of nebramycins II and VII is a mutant strain of the parent nebramycin producing strain, S. tenebrarius ATCC 17920. The mutant strain was obtained by irradiation of the parent strain with ultraviolet light followed by the standard techniques of strain selection.

The following general scheme was used for producing and selecting the mutant strain:

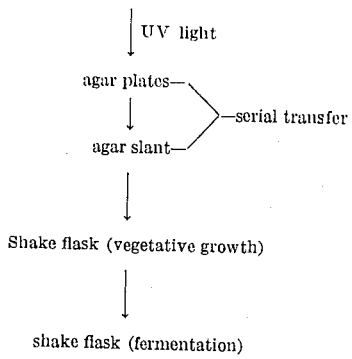

Aqueous spore suspension (S. tenebrarius ATCC 17920)

An aqueous spore suspension of S. tenebrarius ATCC 17920 was irradiated with ultraviolet light and various dilutions of the irradiated suspension were thereafter plated on agar plates. The agar plates were incubated in the absence of light at 37°C. for four days. A number of colonies were randomly selected for transfer to agar slants. Each strain was serially transferred two additional times on agar slant medium before transfer to the vegetative medium for fermentation.

Vegetative inoculum was grown in one liter shake flasks with incubation at 37°C. for 18 hours. The vegetative growth was then introduced into the fermentation medium at a level of about one percent to determine the level of antibiotic activity produced. Daily samples of broth were removed from the shake-flask fermentor and assayed by the standard turbidimetric procedure using Klebsiella pneumoniae FDA K 24 as the test organism.

The various nebramycin factors produced by the mutant strains were identified by bioautograms by comparison with the known factors produced by the parent culture.

The mutant strain of this invention, selected according to the above-described general procedure, produces only nebramycin factor II along with a minor amount of nebramycin VII and lesser amounts of nebramine.

The parent organism S. tenebrarius ATCC 17920, is a spiral-forming, thermo-durant, aerobic to microaerobic Streptomyces with oblong smooth-walled spores. it is unique in being inhibited by relatively low intensities of artificial light. Because of the latter property, the species name Streptomyces tenebrarius sp. n. has been selected for this organism.

The organism was isolated from a soil sample by suspending portions of the soil sample in sterile distilled water and streaking the suspension on nutrient agar. The seeded nutrient agar plates were incubated at 25°–35°C. until growth was secured. At the end of the incubation period, colonies of the antibiotic-producing organisms were transferred with a sterile platinum loop to agar slants. The agar slants were then incubated to provide suitable quantities of inoculun for the production of the antibiotics.

The parent strain, S. tenebrarius ATCC 17920 which produces the nebramycin complex of antibiotics has been placed on permanent deposit, without restriction as to availability, with the American Type Culture Collection at Washington, D. C. and has been assigned the culture No. ATCC 17920.

The following is a taxonomic description of *S. tenebrarius* ATCC 17920, the parent strain from which the nebramycin II producing mutant strain is derived.

The methods employed in the taxonomic studies of *S. tenebrarius* ATCC 17920 are those commonly used in the taxonomy of actinomycetes. Cultural characteristics were observed after 14 days incubation. Morphology was determined on Czapek's peptone agar and Bennett's agar during 2 to 7 days incubation. Action on milk and the reduction of nitrate were observed at 7 and 14 days, hydrogen sulfide production at 24 and 48 hours, and carbon utilization at 10 days. Unless otherwise noted, the cultures were incubated at 37°C. Carbon utilization tests were carried out according to the method described by Pridham and Gottlieb, J. Bact., 56, 107 (1948).

The figures in parentheses refer to color blocks in Maerz and Paul, Dictionary of Color, McGraw Book Company, (1950). The colors represented by the color blocks have been translated into the ISCC-NBS color names as found in Circular 553, U.S. Department of Commerce, National Bureau of Standards, 1955.

MICROSCOPIC MORPHOLOGY, CULTURAL CHARACTERISTICS AND PHYSIOLOGY OF *S. TENEBRARNS* ATCC 17920

On Czapek's-peptone agar, branching spore forms are formed in random clusters on the aerial mycelium. Isolated spores are rare. The intact aerial mycelium is easily detached from the substrate. Mature spore chains usually form 5–6 open spirals. Spores are oblong to cylindrical. When observed with the aid of the electron microscope the spores appear smooth and measure 0.7 to 1.3 by 2.0 to 2.1 microns. Sclerotia were observed on Bennett's medium.

Colony characteristics on:

Czapek's agar—Amount of growth sparse; aerial mycelium sparse, pale orange-yellow (11-A2); sporulation fair; reverse pale orange-yellow (11-A2); soluble pigment slight pink (1-B1).

Czapek's peptone—Growth abundant; aerial mycelium abundant, light yellowish brown with white areas (11-A4); sporulation abundant; reverse light grayish red (4-H1); soluble pigment grayish pink (4-B1).

Calcium malate agar—Growth moderate, aerial mycelium moderate, pale orange-yellow (11-A2); sporulation moderate; reverse grayish pink (4-D1); soluble pigment grayish pink (4-B1).

Tyrosine agar—Growth scant, aerial mycelium scant, pale orange-yellow (9-B2); scant sporulation; reverse pale orange-yellow (10-B3); no soluble pigment.

Inorganic salts-starch agar—Growth moderate, aerial mycelium moderate, brownish pink with white areas (11-A4); sporulation abundant; reverse pale yellow (11-B2); soluble pigment pale yellow (11-B2).

Glucose-asparagine agar—Growth moderate, aerial mycelium moderate, pale yellow (9-D2) with white areas (10-A1); moderate sporulation; reverse pale yellow (11-B2); no soluble pigment.

Tomato paste-oatmeal—Growth abundant, aerial mycelium abundant, light yellowish brown (12-B5); abundant sporulation; reverse dark grayish reddish brown (48-J2); soluble pigment dark purplish red (47-H1).

Yeast extract—Abundant growth, abundant aerial mycelium, pale orange-yellow (11-A2) with white areas; abundant sporulation; reverse moderate yellow (11-J6); no soluble pigment.

Nutrient agar—Growth sparse, sparse white (10-A1) aerial mycelium; sparse sporulation; reverse grayish greenish yellow (12—12); no soluble pigment.

Bennett's agar—Growth moderate, moderate white (10-A1 to 10-B1) aerial mycelium; moderate sporulation; reverse pale yellow (11-C2); no soluble pigment.

Action on milk—Heavy yellow ring of growth on surface.

Coagulation and peptonization observed.

Nitrate reduction—Positive.

$H_2S$ production—negative.

Nutrient gelatin—Complete liquefaction after 14 days.

Temperature requirements on Czapek's peptone agar:

20°—No growth.
26°—Fair growth, no aerial mycelium.
30°—Growth and aerial mycelium moderate but no sporulation.
37°—Growth, aerial mycelium and sporulation all abundant.
43°—Growth, aerial mycelium and sporulation all abundant.
50°—Growth, aerial mycelium and sporulation all abundant.
55°—Scant growth.
60°—No growth.

Thermal death point—Spores from a spore suspension heated to 75°C. for 15 minutes remain viable. When the spore suspension was heated to 100°C. for 15 minutes, no spores were viable.

Oxygen tension—Growth is either aerobic or microaerophilic in stab cultures.

Effect of ferric ion—A red soluble pigment is produced only in the presence of ferric ion and the intensity of pigmentation is proportional to the concentration of ferric ion within a given range.

Effect of hydrogen ion concentration, observed on Czapek's peptone agar—No growth below pH 5.0; from pH 5.0 to 6.0 growth and aerial mycelium are fair. Growth and sporulation are abundant at pH 7.0; from pH 8.0 to 8.6 growth and aerial mycelium are fair. The soluble pigment is most intense at pH 5.0 to 6.0 and is slight to absent from pH 6.5 to 8.6.

Reaction to light, observed on Czapek's agar—Growth and sporulation are abundant in the dark. When plate cultures are incubated 15 inches from a 15 watt standard cool white fluorescent light source, growth is sparse and aerial mycelium is absent. Growth and aerial mycelium are moderate when the plate cultures are incubated 15 inches from a 60 watt frosted tungsten lightbulb.

In the table summarizing the results of the carbon utilization test carried out with *S. tenebrarius* ATCC 17920, the symbols employed are interpreted as follows:

+ = positive
(+) = probable (−)= questionable
− = none

TABLE II

Carbon Utilization by S. tenebrarius Strain ATCC 17920

| Carbon Source | Response | Carbon Source | Response |
| --- | --- | --- | --- |
| L(+) Arabinose | − | D(+) Trehalose | + |
| L(+) Rhamnose | − | L(+) Raffinose | − |
| D(−) Ribose | + | Cellulose | − |
| D(+) Xylose | − | Inulin | (−) |
| D(−) Fructose | + | i-Inositol | + |
| D(+) Mannose | + | Mannitol | − |
| D(+) Glucose | + | d-Sorbitol | (−) |
| Lactose | (−) | Salicin | (+) |
| Maltose | + | Control (no carbon) | (−) |
| Sucrose | (+) | | |

S. tenebrarius ATCC 17920 produces, in addition to nebramycin, the known antifungal antibiotic caerulomycin, which is also produced by Streptomyces caerulius [Can. J. Microbiol., 5, 317 (1959)]. Investigation of a culture of the latter organism revealed that it does not produce nebramycin under the conditions described for its culture, nor can it be induced to do so under varied conditions. The novel mutant strain of this invention, S. tenebrarius NRRL 3816 mutant strain ex S. tenebrarius ATCC 17920, has not produced any detectable amount of the antibiotic caerulomycin under the conditions of the present method.

The discussion of the fermentation method for producing nebramycin II which follows is also applicable to the production of the new nebramycin VII which is produced incidental to nebramycin II as mentioned above.

The culture medium employable in the production of nebramycins II and VII in the present method can be any one of several media since, as is apparent from the above-described utilization test, the parent organism producing nebramycin II is capable of utilizing a variety of energy sources. However, for economy of production, yield of antibiotic, and ease of isolation, certain culture media containing relatively simple nutrient sources are preferable. For example, the media which are useful in the production of nebramycin II include an assimilable source of carbon such as glucose, fructose, mannose, maltose, starch, and the like. A highly preferred source of carbon is glucose. In addition, the employable media include a source of assimilable nitrogen, such as peptones, hydrolyzed casein, yeast, amino acids, and the like. Presently preferred sources of nitrogen are peptones, hydrolyzed casein and glutamine.

Mineral salts, for example those providing calcium, magnesium, sodium, potassium, chloride, sulfate, phosphate, and carbonate ions can be incorporated in the media with beneficial results, although an excess of phosphate should be avoided since it appears to depress yields of the antibiotic. A source of growth factors such as yeast or yeast extract can also be beneficially included in the medium.

As is necessary for the growth and development of other microorganisms, essential trace elements should also be included in the culture medium for growing the organism employed in this invention. Such trace elements are commonly present as impurities incidental to the addition of other constituents of the medium.

Submerged aerobic culture conditions are the conditions of choice for the production of nebramycin II. For preparation of relatively small amounts, shake flasks and surface culture can be employed, but for the preparation of large amounts, submerged aerobic culture in sterile tanks is preferred. The medium in the sterile tank can be inoculated with a sporulated suspension, but because of the growth lag expienced when a sporulated suspension is used as the inoculum, the vegetative form of the culture is preferred. By thus avoiding the growth lag, more efficient use of the fermentation equipment is realized. Accordingly, it is desirable first to produce a vegetative inoculum of the organism by inoculating a relatively small quantity of culture medium with the spore form of the organism and, when a young active vegetative inoculum has been obtained, to transfer the vegetative inoculum aseptically to the large tank. Suitably, an aliquot of the vegetative inoculum, equal to about 4 percent of the volume of the medium into which the inoculum is introduced, is employed. The fermentation medium in which the vegetative inoculum is produced can be either the same as or different from the medium utilized for the large scale production of nebramycin.

As is evident from the above detailed temperature requirements for the organism, the organism will grow over a relatively wide range of temperatures. However, the organisms appear to grow best at temperatures in the range of about 30° to 50°C. Optimal production of nebramycin II appears to occur at a temperature of about 37° to 43°C. The organism which produces nebramycin II is sensitive to light and does not grow well in the presence thereof. Accordingly, fermentations employing the organism are desirably carried out in the absence of visible light.

In accord with the customary practice in aerobic submerged culture processes, sterile air is blown through the culture medium. For efficient growth of the organism and nebramycin II production the volume of air employed in the tank production of nebramycin II is upwards of 0.1 volume of air per minute per volume of culture medium, and is preferably substantially higher. Efficient growth of the organism and optimal yields of nebramycin Ii are obtained when the volume of air employed is at least one volume of air per minute per volume of culture medium.

The concentration of nebramycin II and nebramycin VII in the fermentation medium can readily be followed during the course of the fermentation by testing samples of the culture medium for their inhibitory activity against the growth of organisms known to be inhibited in the presence of nebramycin II. Two of the organisms so employed in following the production of nebramycin II are *Klebsiella pneumoniae* and *Mycobacterium butyricum*. The former organism is generally employed in the well-known turbidimetric technique, while the latter is utilized in the cup plate method.

In general, maximum production of the antibiotic occurs within about 4 to 7 days after inoculation of the culture medium when submerged aerobic culture or shake flask culture is employed and within a somewhat longer time when surface culture is used.

The mycelium and undissolved residues are removed from the fermentation broth by conventional means such as filtration or centrifugation. The antibiotic activity is contained in the filtered broth and can be recovered therefrom by employing adsorption or extraction techniques.

In the process of this invention, nebramycin II and nebramycin VII are first isolated from the filtered broth as an antibiotic mixture comprising between about 90 and about 95 percent nebramycin II. Following the isolation and purification of the antibiotic mixture the two antibiotics are separated from each other by gradient elution from a cationic exchange resin.

Because of the large quantities of solvents required in recovering antibiotics from fermentation broths by extraction, it is preferable to use adsorption procedures in the recovery of nebramycin II and VII from the culture medium. The adsorbents which can be employed most advantageously in the recovery are the cationic exchange resins, for example, those resins of the IRC-50 type available commercially under the tradename "Amberlite IRC-50". While IRC-50 is used illustratively in the present description, it will be understood by those skilled in the art that other resins with similar characteristics can be employed with equally good results.

In recovering nebramycin II and VII from the fermentation medium, the whole broth is filtered to remove mycelium and other undissolved solids with the help of a filter aid such as diatomaceous earth and the filtered broth is passed over a column packed with a cationic exchange resin such as IRC 50 in the ammonium cycle. The resin is then washed with 2–3 volumes of water and the adsorbed antibiotics are eluted with ammonium hydroxide of between about 0.5 and 3.0 normality. The eluate is concentrated in vacuo to an aqueous concentrate and the antibiotic mixture is obtained as an insoluble acid addition salt by acidifying the concentrate with a suitable acid, such as sulfuric acid or a long chain alkyl sulfonic acid such as dodecylsulfonic acid or dodecylbenzenesulfonic acid.

The antibiotic nebramycin salt mixture thus obtained can be employed for many purposes without separating the two antibiotics. For example, the mixture of antibiotics can be used in treating gram-negative infections in poultry just as the pure nebramycin II can be used.

Alternatively, the eluate can be evaporated to dryness and the crude nebramycin II and VII mixture can be obtained in purified form as the free base by crystallization of the crude antibiotic residue from an alcoholic solvent such as methanol, ethanol or isopropanol. Likewise, the nebramycin mixture can be purified by rechromatography of the aqueous antibiotic concentrate obtained as described above over a resin such as IRC 50 in the ammonium cycle.

Frequently, as in the case of many antibiotic recovery procedures, the initial separation of mycelium and other undissolved solids from the aqueous broth involves a time consuming filtration. In order to circumvent such an uneconomical filtration, nebramycin II and VII can be recovered from the whole broth by adding the cationic exchange resin directly to the unfiltered fermentation medium. The culture medium-exchange resin mixture is then stirred gently for a short time, about 2 to 4 hours, to insure adsorption of the nebramycins on the resin. Stirring is discontinued and the supernatant liquid is decanted from the settled resin and other solids. The mycelium is then back-flushed from the resin which is then packed into a chromatography column and eluted with aqueous ammonium hydroxide. The eluate is then evaporated to an aqueous concentrate or to a solid residue and the nebramycin mixture is obtained either as an insoluble acid addition salt or as the crystalline free base as described previously.

Nebramycin II is separated from nebramycin VII by chromatography over a cationic exchange resin, and preferably Amberlite CG-50, in the ammonium cycle.

The eluate off the IRC-50 column containing both antibiotics is evaporated to dryness and the dried antibiotic mixture is dissolved in a convenient volume of deionized water. The aqueous solution of the antibiotics is then poured onto a column packed with Amberlite CG-50 resin in the ammonium cycle. The antibiotics are eluted by the gradient elution technique by employing the gradient of 0.05 to 0.2N aqueous ammonium hydroxide. Multiple fractions are collected and each is assayed microbiologically and by thin layer chromatography. Nebramycin VII is eluted in the early fractions with the intermediate fractions containing both nebramycin VII and nebramycin II. The later fractions contain only nebramycin II. All fractions containing the same antibiotic are combined and are evaporated to dryness. The dried nebramycin II residue is further purified by recrystallization from methanol or ethanol. The dried nebramycin VII residue is crystallized initially from aqueous n-propanol and is then recrystallized from methanol to obtain the purified crystalline antibiotic.

The intermediate fractions off the column containing nebramycin II and some nebramycin VII can be rechromatographed to afford further separation.

The following example more fully illustrates the practice of this invention.

EXAMPLE 1

A sporulated culture of Streptomyces tenebrarius NRRL 3816 mutant strain ex S. tenebrarius ATCC 17920 is produced by growing the organism on a modified Bennett's agar slant medium having the following composition:

| | | |
|---|---|---|
| Dextrin | 10 | g. |
| Yeast extract | 1 | g. |
| Hydrolyzed casein (NZ-Amine A, sold by Sheffield Farms) | 2 | g. |
| Beef extract | 1 | g. |
| $CaCl_2.6H_2O$ | 0.01 | g. |
| Washed agar | 20 | g. |
| Deionized water, q.s. to | 1000 | ml. |

The pH of the medium is adjusted to pH 7 before autoclaving.

The slant is inoculated with spores of S. tenebrarius NRRL 3816 mutant strain and is incubated in the absence of visible light for five days at 37°C. The culture growth on the slant is covered with water and the slant is scraped gently to remove the spores to provide an aqueous spore suspension.

The spore suspension so obtained is employed to inoculate 800 ml. of a medium having the following composition:

| | | |
|---|---|---|
| Dextrose | 0.05 | % |
| Nutrisoy flour (Sold by Archer-Daniels-Midland Co.-contains 35-45 percent of dispersible protein) | 1.5 | % |
| Dextrin 700 (A low chloride potato dextrin made by the Morningstar-Paisley Co.) | 1 | % |
| Potassium chloride | 0.1 | % |
| NZ—Amine A | 0.3 | % |
| $KH_2PO_4$ | 0.05 | % |
| $MgSO_4.7H_2O$ | 0.5 | % |
| $CaCl_2.2H_2O$ | 0.025 | % |
| Deionized water | | |

The inoculated vegetative medium is incubated at about 37°C. for 16 hours on a rotary shaker operating at 250 rpm. and having a 2½ inch throw.

A 50-ml. portion of the vegetative culture is employed to inoculate a 44-liter seed tank containing an aqueous medium having the following composition:

| | | |
|---|---|---|
| Dextrose | 1 | % |
| Soybean grits | 1.5 | % |
| $KH_2PO_4$ | 0.05 | % |
| $MgSO_4$ | 0.5 | % |
| KCl | 0.1 | % |
| $CaCl_2.2H_2O$ | 0.025 | % |
| Antifoam agent | 0.025 | % |

The seed tank medium is sterilized at 120°C. for about 30 minutes. The inoculated seed tank medium is incubated at 37°C. for 12 hours. Stirring at a speed of 370 rpm. is begun immediately after inoculation and aeration at the rate of 0.8 cubic feet per minute is maintained throughout the incubation period. At the end of the incubation period the contents of the seed tank are utilized to inoculate a 250 gallon fermentor containing a medium having the following composition:

| | | |
|---|---|---|
| Dextrose | 4 | % |
| Refined soybean oil | 3 | % |
| Soybean flour | 3 | % |
| $NH_4Cl$ | 0.5 | % |
| $CaCl_2$ | 0.3 | % |
| $MgSO_4$ | 0.2 | % |
| $NH_4NO_3$ | 0.1 | % |
| NZ-Amine A | 0.5 | % |
| Antifoam agent | 0.2 | % |
| Deionized water | | |

Prior to inoculation, the fermentation medium is sterilized for 30 minutes at 120°C. The fermentation is carried out at 37°C. with aeration at the rate of 17 cubic feet per minute throughout the period from inoculation to harvest. Stirring is begun at 125 rpm. and is increased to 180 rpm. after 12 hours. the fermentation is continued for five days.

The whole broth was adjusted to pH 5.5 by the addition of an aqueous solution of sodium hydroxide and to the whole broth was added IRC-50 ion exchange resin in an amount corresponding to 100 ml. of bed volume per liter of broth. The mixture was stirred gently for 4 hours after which the solids were allowed to settle out. The supernatant was decanted and the mycelium was washed from the resin by backflushing with deionized water. The resin containing the adsorbed nebramycin II and nebramycin VII was washed into a chromatography column and further washed with 10 volumes of deionized water. The resin was then eluted with 3N ammonium hydroxide in an amount corresponding to about 3 times the resin volume. The eluate was evaporated to dryness to yield the crude antibiotic residue. The residue was washed with ethanol to remove colored pigments and was then dissolved in a minimum volume of deionized water.

The aqueous solution containing nebramycin II and nebramycin VII was poured onto a column packed with Amberlite CG-50 resin in the ammonium cycle. The antibiotics were then eluted from the resin by employing the gradient 0.05 0.2N ammonium hydroxide. The early fractions containing only nebramycin VII were pooled and evaporated to dryness. The residue was crystallized from 20 percent aqueous n-propanol and recrystallized from methanol to obtain purified nebramycin VII.

The fractions containing only nebramycin II were combined and evaporated to dryness. The residue was crystallized from aqueous ethanol to provide the purified antibiotic nebramycin II.

I claim:

1. The process for producing nebramycin II and nebramycin VII which comprises cultivating *Streptomyces tenebrarius* NRRL 3816, mutant strain ex *Streptomyces tenebrarius* ATCC 17920 in an aqueous nutrient culture medium containing assimilable sources of carbon, nitrogen and inorganic salts under submerged aerobic fermentation conditions until a substantial amount of antibiotic activity is produced by said organism in said culture medium.

2. The process of claim 1 wherein the culture medium is maintained at a temperature between about 37° and 43°C. and the growth of the organism is carried out for about 4 to 7 days.

3. The process of claim 1 wherein the growth of the organism is carried out in the absence of visible light.

* * * * *